United States Patent [19]

Liberman

[11] 4,176,675

[45] Dec. 4, 1979

[54] FLOATING SEAT BUTTERFLY VALVE

[75] Inventor: Richard Liberman, Montreal, Canada

[73] Assignee: Crane Co., New York, N.Y.

[21] Appl. No.: 897,613

[22] Filed: Apr. 19, 1978

[30] Foreign Application Priority Data

Apr. 20, 1977 [CH] Switzerland .......................... 276542

[51] Int. Cl.² ........................ F16K 49/00; F16K 1/22; F16K 25/00
[52] U.S. Cl. ................................. 137/340; 251/306; 251/173
[58] Field of Search ...................... 251/173, 306, 307; 137/340

[56] References Cited

U.S. PATENT DOCUMENTS

| Re. 23,613 | 2/1953 | Danks | 251/173 |
|---|---|---|---|
| 1,990,309 | 2/1935 | Phillips | 251/173 |
| 2,705,016 | 3/1955 | Saar | 251/173 |
| 3,084,715 | 4/1963 | Scharres | 251/173 |
| 3,311,128 | 3/1967 | Taylor | 251/173 |
| 3,338,551 | 8/1967 | Black | 251/306 |
| 3,502,299 | 3/1970 | Phillips | 251/306 |
| 3,633,872 | 1/1972 | Wright | 251/306 |
| 3,727,883 | 4/1973 | Conners et al. | 251/306 |
| 3,734,457 | 5/1973 | Roos | 251/173 |
| 3,771,763 | 11/1973 | Myers | 251/173 |
| 4,058,290 | 11/1977 | Nelimarrka | 251/306 |
| 4,120,482 | 10/1978 | Cox | 251/173 |

FOREIGN PATENT DOCUMENTS

| 1251117 | 9/1967 | Fed. Rep. of Germany | 251/306 |
|---|---|---|---|
| 1181609 | 6/1959 | France | 251/306 |

Primary Examiner—Martin P. Schwadron
Assistant Examiner—A. Michael Chambers
Attorney, Agent, or Firm—George S. Schwind

[57] ABSTRACT

A butterfly valve assembly is disclosed having a resilient seat to compensate for wear. The valve has a rigid body with opposing end surfaces adapted to mate with opposing flanges. The body has opposing internal end surfaces spaced inwards from and having a smaller diameter than the external parallel end surfaces, a flexible ring within the annular body is adapted to deform under uneven stresses but to return to its original shape when the stresses are released. An annular seat of elastomeric material supports the flexible ring in a flexible relationship within the body to form a seat assembly leaving an annular space beteeen an external surface of the seat assembly and an internal surface of the body. The seat assembly has two external flanges, one at each end which overlap the internal end surfaces and are adapted to be clamped between the internal end surfaces and the opposing flanges. A valve closure member is rotatably mounted to the body within the seat assembly adapted to seal with an internal surface of the annular seat and thus closes the valve.

2 Claims, 5 Drawing Figures

FLOATING SEAT BUTTERFLY VALVE

This invention relates to butterfly valves wherein a disc is rotated in an annular body used in the control of fluids in a variety of piping applications. More particularly this invention relates to a butterfly valve of the wafer and lug wafer type wherein a relatively thin valve body is positioned between opposing flanges of a pipe or other equipment.

Wafer type butterfly valves are well known in the art. The majority of these valves have a resilient seat so that when the disc is rotated in the valve body it contacts or impinges on the resilient seat around its circumference and thus seals the valve. It is found that the position on the resilient seat where a disc impinges often wears or distorts under pressure thus causing leakage past the seat. In many of the presently known types of butterfly valves, there is no compensation for wear and thus once a resilient seat starts to wear it is necessary to replace the seat.

A typical resilient seat in a butterfly valve is made from a molded elastomeric material such as a synthetic rubber. Other materials which are wear resistant and capable of withstanding the operating conditions may also be suitable. In most butterfly valves, the seat is generally circular so that the valve disc closes when it is perpendicular to the axis of the passageway through the valve. In a few embodiments the valve seat is positioned so that the disc is not perpendicular to the axis of the passageway when closed. In most valves, however, there is only one position where the disc impinges on the seat to close and seal the valve.

In most butterfly valves the bore through the annular body is generally machined in order to accurately locate the resilient valve seat and ensure leak tightness when the valve is closed. If the seat does not sit circumferentially in the body, the disc does not impinge evenly or sufficiently around the circumference of the seat. If the impingement force between the disc and the seat is too high, a considerable force is needed to open and close the valve and this, in turn, increases the wear of the seat material. If, on the other hand, there is too little impingement between the disc and the seat, leakage can occur even when the valve is fully closed.

Another problem that sometimes occurs with this type of butterfly valve is the permanent distortion of the resilient material due to loading. This is referred to as the cold flow of resilient material, and results from disc impingement or the clamping of the resilient material between the valve and opposing retaining flanges. Distortion of this type can cause a leak between the valve seat and the disc which can only be cured by replacing the resilient valve seat. In present types of valves with perpendicular disc sealing positions, the desired sealing only occurs when the disc is turned to the 90° position. When the disc is positioned a few degrees off this perpendicular position, it becomes out-of-round viewed axially. The resilient material cannot compensate for this out-of-roundness and thus uniform impingement around the disc is lost. Another problem that can occur with butterfly valves of this type is when they are used in vacuum conditions. Under these conditions the resilient valve seat can collapse into the passageway when the disc is opened and restrict the flow through the valve.

The present invention contemplates a novel approach to overcome some of these problems and others by providing a flexibly located valve seat having a flexible ring therein which may be partly deformed but returns to its original shape. When fully assembled in the valve, the seat has a circumferential clearance between its external surface and the bore of the annular valve body. Because of this flexibly mounted seat arrangement the body bore does not require a machine finish. Furthermore, the flexible ring allows the seat to change its axially viewed shape and thus take into account a slightly out-of-roundness shape of the disc. This ability of the seat to change its cross-sectional shape allows the valve disc to impinge evenly on the seat around its circumference and seal when the angle between the plane of the disc seat and the plane perpendicular to the passageway axis is less than about 5° viewed axially. The flexible seat adjusts to become an elliptical ring to comply with the projected elliptical shape of the disc perimeter. The flexible valve seat permits the disc to relocate the sealing position on the seat when for example wear occurs, or adjustment for leakage is necessary. If the disc seals and closes the valve when the disc is not in the axially perpendicular position, and if wear or leakage subsequently occurs at this particular sealing location, then the disc may be rotated closer to the perpendicular of the passageway axis to a new sealing position.

The present invention provides a butterfly valve assembly adapted for positioning between opposing flanges, comprising: a rigid body having opposing external flat parallel end surfaces adapted to mate with the opposing flanges, the body having opposing internal end surfaces spaced inwards from, and having a smaller diameter than the external parallel end surfaces; a flexible ring adapted to deform under uneven stresses, but to return to its original shape when the stresses are released, the flexible ring being within the annular body; an annular seat of elastomeric material supporting the flexible ring in a flexible relationship within the body to form a seat assembly leaving an annular space between an external surface of the seat assembly and an internal surface of the body, the seat assembly having two external flanges one at each end, overlapping the internal end surfaces adapted to be clamped between the internal end surfaces and the opposing flanges; and a valve closure member rotatably mounted to the body within the seat assembly, adapted to seal with an internal surface of the annular seat to close the valve.

In embodiments of the present invention, the rigid body has two internal annular ribs with a space therebetween. This space increases the annular space surrounding the flexible seat and may be used for circulating a heating or cooling medium to contain the temperature of the seat assembly within desired limits. In other embodiments the valve assembly also provides a valve stem connected to a circular disc, the valve stem extending through the centre of the rigid body, the valve stem having a neck portion with a two way seal therein. The valve stem may be connected to a handle and a quadrant means mounted above the rigid body, the quadrant means having a series of notches that can be engaged by the handle allowing the valve stem to be rotated and locked positively in a number of positions. In another embodiment the quadrant means has at least one stop pin located in any one of a series of holes equispaced about a radial arc in the quadrant to position the disc in a partially closed position and reduce rotary movement of the disc.

In drawings which illustrate embodiments of the invention;

Figure 3:
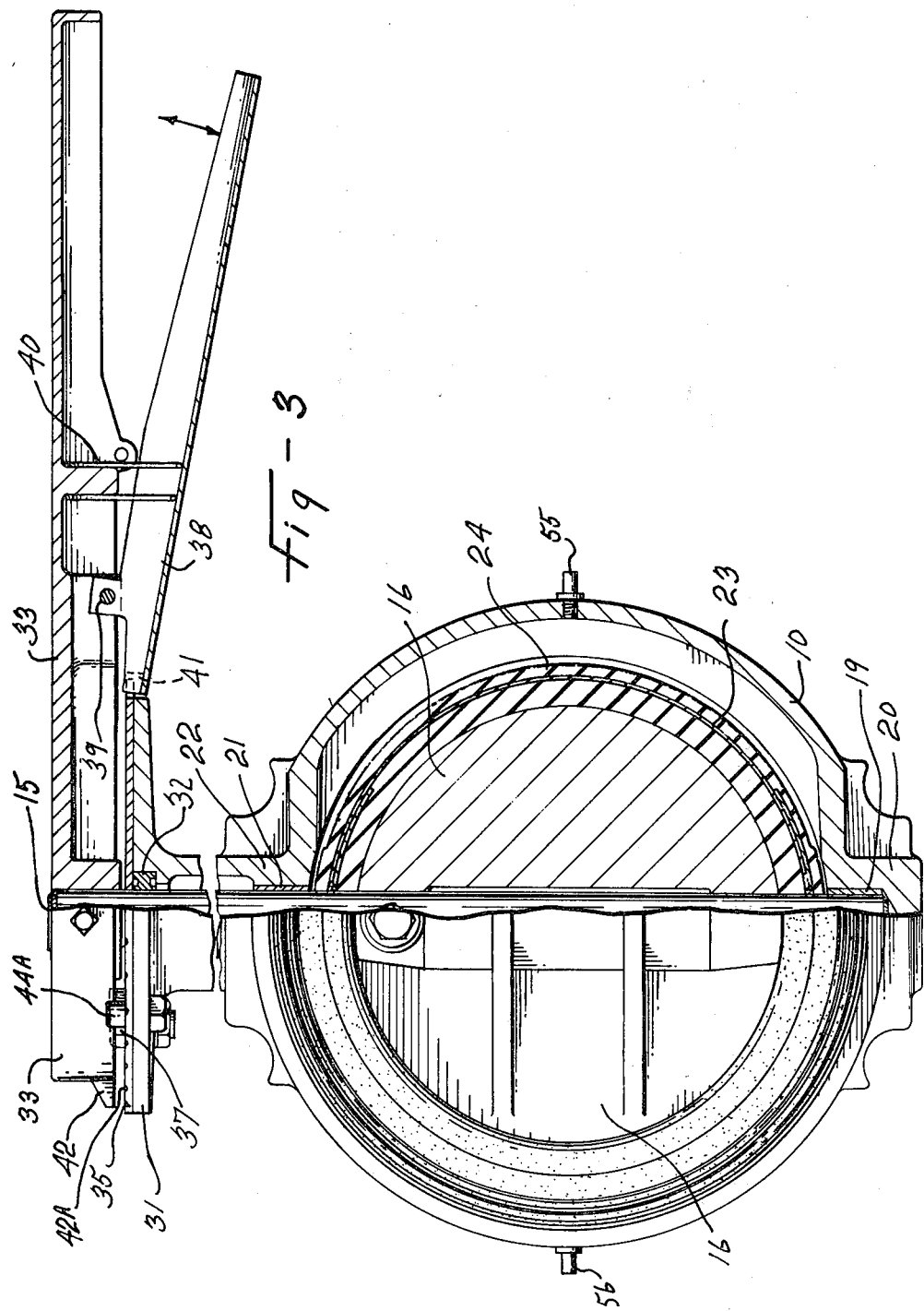
FIG. 3 is an end view partially in cross-section of the valve of FIG. 1.

FIG. 4 shown on the first page of drawings is a top view of the valve in FIG. 3 showing the valve handle and quadrant.

FIG. 5 shown on the second page of drawings is a partial cross-sectional side view through a portion of the stem and the disc showing a valve of the present invention positioned between two flanges.

Figure 1:
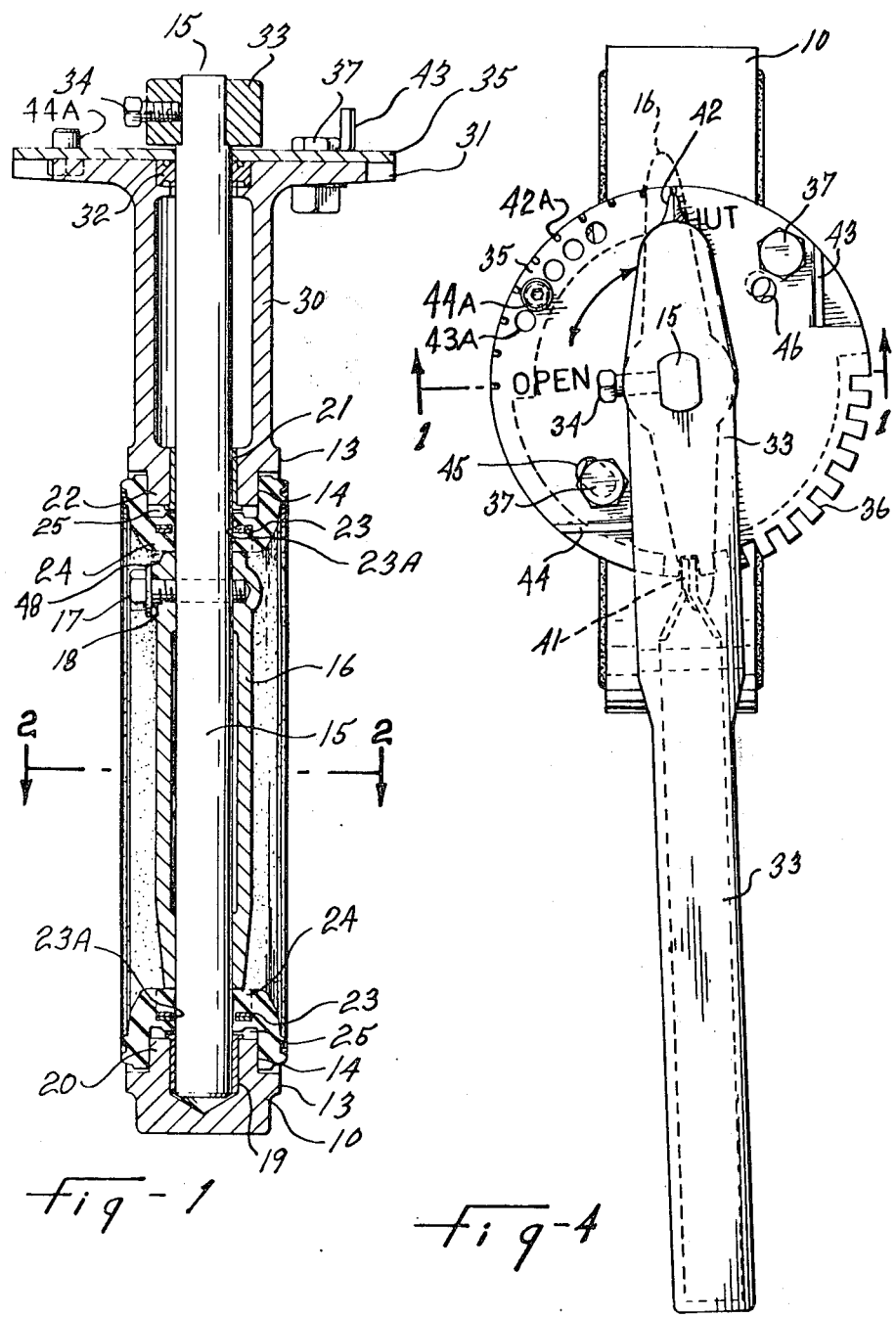
FIG. 1 is a cross-sectional side view of one embodiment of a valve of the present invention.
Figure 2:
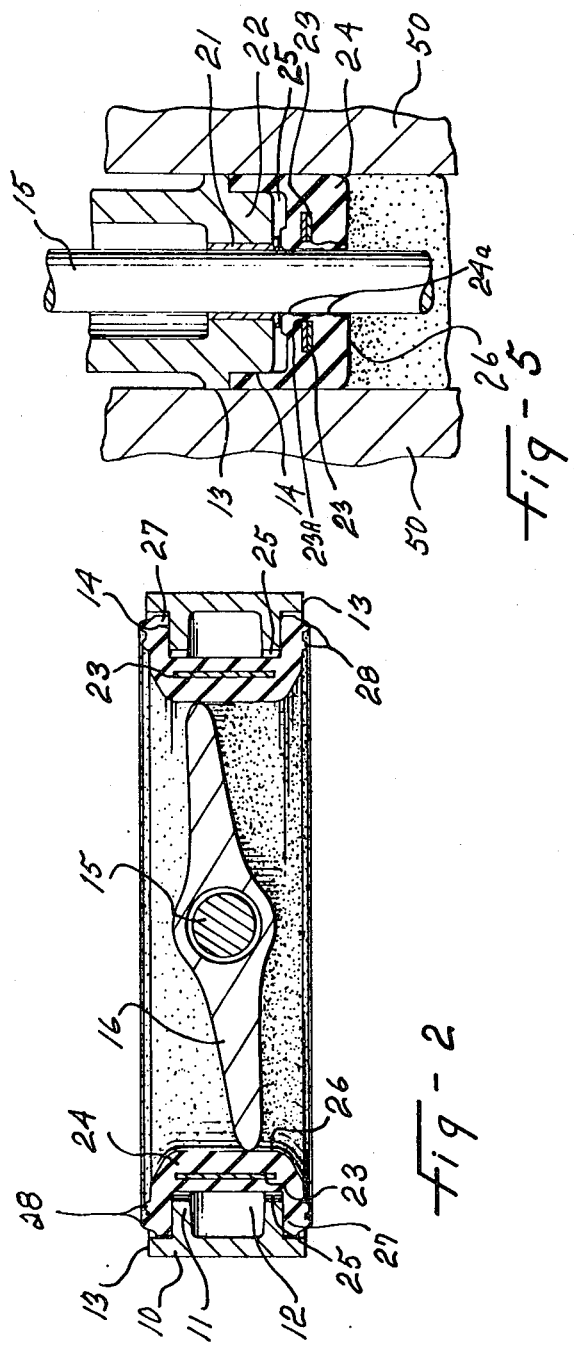
FIG. 2 is a cross-sectional plan view taken at line 2—2 of FIG. 1.

Referring now to the drawings, the wafer type butterfly valve has a rigid annular body 10 as seen in FIGS. 1, 2 and 3. The annular body is preferably made from cast iron, but in some cases it may be brass, bronze, nodular iron, malleable iron, ductile iron or stainless steel to suit certain corrosive conditions. The annular body 10 has two internal annular ribs 11 as seen in FIG. 2. These ribs extend around the internal circumference of the body 10 and provide an annular space 12 between them. Opposing external parallel end surfaces 13 of the annular body 10 are precision cast. Opposing internal parallel end surfaces 14 of the ribs 11 are also precision cast and have a smaller diameter than the external end surfaces 13 and are spaced inwards from them. No surfaces with the exception of parts of the stem bore in the annular body need be machined but may exist with the "as cast" finish. A rotary valve stem 15 passes through the centre of the annular body 10 and is attached to a closure disc 16 by means of a machine screw 17 which is sealed by an O-ring 18 using washer 48. The rotary stem 15 is supported at the base of the annular body 10 in a self-lubricating bearing 19 contained in a boss 20 which forms part of the body 10. The annular space 12 between the ribs at the base of the rotary stem 15 is taken up by a flattened section of the body 10. Where the stem 15 extends from the annular body 10 another self-lubricated bearing 21 supports it. This bearing 21 is located within a boss 22 similar to the lower boss 20 and forms part of the body 10.

A flexible metal ring 23 having round apertures 23A, 180° apart, to allow the stem 15 to pass therethrough, is positioned concentrically within an annular seat 24. The metal ring 23 is reinforced in the area of the apertures 23A. The apertures 23A are larger in diameter than the stem 15 to allow seat material to be interposed between the ring 23 and the stem 15. The ring 23 is preferably made from steel or other suitable high strength metals and has the annular seat 24 made of elastomeric material bonded about its surface. The annular seat 24 is a resilient material preferably a one-piece molded rubber material having an internal passageway surface 26 which provides a seat for the disc 16 when the valve is closed. The internal diameter of the annular seat 24 is smaller than the external diameter of the disc 16. A cylindrical aperture in the annular seat 24 for the stem to pass therethrough has two internal radiused molded beads 24A as may be seen in FIG. 5, formed of resilient material which act as seals for the stem 15. These molded beads 24A are compressed and deformed when the stem is in place to conform to the cylindrical surface shape of the stem. The annular seat 24 has two external flanges 27 which extend around the ends of the metal ring 23 forming a seat having a U-shape in half cross-section. The two external flanges 27 overlap the recessed opposing internal parallel surfaces 14 of the ribs 11. The end surfaces of these external flanges 27 are tapered radially inwards towards the fluid flow axis of the valve body and each have two concentric molded radiused beads 28 positioned thereon. When the valve is in service and clamped between two opposing flanges these beads 28 are deformed under flange compression and the resilient material of the head deforms to seal the flange face. On each side of the internal passageway surface 26 of the annular seat 24 there is a radial corner which has a conical end face to prevent the resilient material from distorting and bulging unevenly when the external flanges 27 are clamped between the two opposing flanges and interfere with the operation of the closure disc. An annular clearance 25 remains between the annular seat 24 and the inside diameter of the two ribs 11 thus permitting radial deformation of the annular seat without interfering with the body of the valve.

The valve body 10 has an annular neck portion 30 as shown in FIG. 1 which surrounds the valve stem 15. This neck portion 30 is a continuation of the casting of the main annular body 10 and terminates at a partially round neck flange 31. A seal 32 is incorporated within this quadrant flange 31 to exclude dirt from the valve and to prevent leakage along the valve stem 15 either out of the valve if there is a pressure internally or into the valve if there is a vacuum internally. The seal shown is a two way seal to prevent flow from either direction. This seal may be replaced by two single direction seals back-to-back to serve the same purpose.

As may be seen in FIGS. 3 and 4, a long armed handle 33 is retained at one end of the valve stem 15 having two flattened surfaces by means of a set screw 34. A circular quadrant 35 having a series of slots 36 in a number of equally spaced positions in a sector less than 90° is mounted on top of the neck flange 31 and held in position by two sets of nuts and bolts 37. A grip lever 38 is provided beneath the handle 33 having a pivot pin 39 attached to the handle upon which the lever pivots and a compression spring 40 maintains the lever in a free extended engaged position. At the end of the grip lever 38 is a locking lug portion 41 which is adapted to locate and wedge in one of the notches 36 of the quadrant 35 when the lever 38 is in the free extended engaged position.

In the embodiment shown in FIG. 4, the valve disc 16 is in the closed position with the plane of the sealing edge at an angle in a range of approximately 0° to 5° off the 90° perpendicular position. In this closed position, the flexible ring 23 is formed into an elliptical shape by the disc to ensure that the internal passageway surface 26 of the annular seat 24 is impinged upon by the tip of the disc 16 evenly around the circumference. The handle 33 at the top of the stem 15 is positioned so that with the disc 16 in the closed position, namely at an angle in a range of approximately 0° to 5° off the perpendicular position, the handle 33 is approximately 2½° in the direction of closing from the disc sealing edge plane. The quadrant 35 has ten notches 36 which take up a circular arc of approximately 87½°. Each notch is identified by a pointer 42 on the handle 33 pointing to a position indicator marked on the quadrant 35. The position indicator has ten equally spaced marks 42A positioned around the periphery of the quadrant 35 and which take up a circular arc of approximately 87½° with the SHUT position at the perpendicular position for the end notch, and the OPEN position at the axial position of the valve disc 16 for the other end notch. When the handle 33 is moved from the SHUT position to the OPEN position, it passes through an angle of approximately 87½° and thus the disc 16 is less than approximately 2½° from the axial position and presents the minimum resistance to flow through the valve. A stop 43 formed by bending a portion of the quadrant 35 upright is positioned to ensure that the handle 33 does not go beyond the OPEN position, and a similar stop 44 is positioned to prevent the handle going beyond the SHUT position.

A series of holes 43A are equispaced about a radial arc in the quadrant 35 adjacent the marks 42A. A stop pin 44A is shown positioned in one of the holes 43A such that when the handle 33 is rotated, the pointer 42 comes to rest against the stop pin 44A and is aligned with one of the marks 42A. Thus the stop pin 44A provides a stop to locate the disc 16 in a partially open position.

In another embodiment two stop pins 44A may be positioned in two separate holes 43A such that when the handle 33 is rotated, the pointer 42 comes to rest against either one or the other stop pin with less than about 30° of rotary movement.

The nuts and bolts 37 that hold the quadrant 35 to the neck flange 31 pass in one instance through a slot 45 and in another instance through one of two separate holes 46 in the quadrant 35 and through mating holes in the neck flange 31. Thus, whereas in the initial closed position, the disc 16 is at an angle of approximately 5° off the perpendicular position, when the disc does seal around the circumference of the seat then the quadrant position may be changed by moving the nut and bolt 37 to the other hole 46 by rotating the quadrant 35 on the neck flange 31 so that the seating position moves through an angle of approximately 5° and a new closed position occurs on the seat. In this new position, the disc may be in the perpendicular position; thus the annular seat 24 forms into a circle to conform with the circumference of the disc.

When the valve is initially assembled, its fully closed position occurs with the disc at an angle in the range of approximately 85° to the fluid flow axis. If, for example, the disc is closed at an angle of 85° to the pipeline axis, then for 87½° disc movement when the valve is fully open the disc will be at an angle of 2½° to the pipeline axis. If, for example, the disc is at an angle of 90° to the pipeline axis in the closed position, as could exist with seat wear, for 87½° disc movement, it will be at an angle of 2½° to the pipeline axis for the fully OPEN position.

A partial section of a valve assembly is shown in FIG. 5 with two flanges 50 clamped together against the opposite external parallel side surfaces 13 of the annular body 10 compressing the external flanges 27 of the resilient annular seat 24. The two concentric molded beads 28 as seen in FIG. 2 deform and their surface shape contours to the shape of the face of the flange 50 when the valve assembly is clamped together. Thus the flanges 50 hold the annular seat 24 in position relative to the body by clamping and hence support the rigid ring 23 in a flexibly located relationship by means of the elastomeric seat material; that is to say, allowing it to change shape or position to seal with the disc. The resilient material of the seat is flexed, stretched and compressed to allow this movement.

As may be seen in FIG. 3 in another embodiment an inlet connector 55 is positioned on the external diameter of the annular body 10 at an angle of 90° from the entry of the valve stem 15. This inlet connector 55 provides access to the annular space 12 which extends circumferentially around the annular body 10. A cooling medium or heating medium may be passed through the inlet connector 55 to circulate around the annular space 12. The medium passes the stem 15 at the bottom and at the top of the body 10 through the circumferential spaces 25 between the annular seat 24 and the internal surface of the bosses 20 and 22. The medium heats or cools the annular seat 24. An outlet connector 56 positioned at an angle of 90° from the entry of the valve stem 15 diametrically opposite the inlet connector 55 permits complete circulation of the medium through the annular body 10. A suitable cooling fluid medium is used to cool the resilient seat when hot fluids are passed through the valve. This allows higher operating temperatures for the valve without deterioration of the annular seat.

I claim:

1. A butterfly valve assembly adapted for positioning between opposing, spaced-apart flanges in a fluid flow system, said assembly comprising:
    A. a rigid body having opposing external flat parallel end surfaces adapted to mate with the opposing flanges, said body having opposing internal end surfaces spaced inwards from and having a smaller diameter than said external end surfaces, said body adapted to permit fluid flow therethrough and to accept a valve closure member;
    B. a valve closure member rotatably mounted within said body and adapted to cooperate with a seat assembly to regulate fluid flow through said rigid body;
    C. a seat assembly adapted to co-operate with said valve closure member between an open position and a closed position, said seat assembly comprising:
        i. a flexible steel ring disposed in said rigid body for resilient flexible engagement with an annular seat; and,
        ii. an annular seat disposed in said rigid body (supporting said flexible ring), said annular seat is an elastomeric material bonded to and about said flexible ring, said seat assembly and said rigid body defining an annular space therebetween adapted for the passage of a fluid medium therethrough, said seat assembly having an external flange on each end adapted to be clamped between its respective internal end surface and one of the opposing flanges, said external flange on each end extending completely about the flexible steel ring thereby forming a seat for said flexible ring of U-shaped half cross-section configuration; and,
    D. an inlet connector and an outlet connector communicating with the annular space and adapted to receive and pass a fluid medium therethrough, whereby rotation of said valve closure member to a closed position forces said seat assembly to deform into the annual space and simultaneously permits fluid to pass from said inlet connector through the annular space to said outlet connector.

2. The valve assembly according to claim 1 wherein said closure member comprises a circular disc mounted to a rotatable valve stem extending through the center of said rigid body, and wherein said disc seals with the internal surface of said annular seat within a range of approximately 0° to 5° on one side of a plane perpendicular to a fluid flow axis of said rigid valve body.

* * * * *